(12) United States Patent
Williams et al.

(10) Patent No.: US 6,588,557 B2
(45) Date of Patent: Jul. 8, 2003

(54) BLOW MOLDED (HIC) FORMATION WITH ENERGY BUFFERS

(75) Inventors: Shawn R Williams, Auburn Hills, MI (US); Matthew W Liddane, Canton, MI (US); Joseph G Lemmon, Chesterfield, MI (US); Jerry D Loman, Clinton Township, MI (US); Jeffrey S Rausch, Troy, MI (US); Thomas A Lariviere, Macomb, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 71 days.

(21) Appl. No.: 09/825,719

(22) Filed: Apr. 4, 2001

(65) Prior Publication Data

US 2002/0145298 A1 Oct. 10, 2002

(51) Int. Cl.[7] .......................... F16F 7/12; B60R 21/055
(52) U.S. Cl. ....................................... 188/377; 280/751
(58) Field of Search ..................... 188/377; 280/751; 296/39.1, 39.2, 189

(56) References Cited

U.S. PATENT DOCUMENTS

| | | | |
|---|---|---|---|
| 3,638,992 A | 2/1972 | Forshee ................. 296/39.1 |
| 3,868,796 A | 3/1975 | Bush ..................... 52/783.12 |
| 4,890,877 A | 1/1990 | Ashtiani-Zarandi et al. ..... 296/146.7 |
| 5,253,918 A * | 10/1993 | Wood et al. ............... 296/39.2 |
| 5,435,619 A * | 7/1995 | Nakae et al. .............. 296/189 |
| 5,747,140 A | 5/1998 | Heerklotz ................. 428/131 |
| 5,749,193 A | 5/1998 | Bucher .................... 52/506.06 |
| 5,823,611 A | 10/1998 | Daniel et al. ............. 296/214 |
| 5,884,962 A | 3/1999 | Mattingly et al. .......... 296/189 |
| 6,036,227 A | 3/2000 | Lin et al. ................ 280/751 |
| 6,247,745 B1 * | 6/2001 | Carroll et al. ............ 296/189 |

* cited by examiner

*Primary Examiner*—Christopher P. Schwartz
(74) *Attorney, Agent, or Firm*—Edwin W. Bacon, Jr.

(57) ABSTRACT

A blow molded (HIC) formation with energy buffers provides absorption of vehicle occupant cranial impacts. A generally plastic, forced air, expanded formation defines a cavity, the formation walls being of varied geometric shapes having calculated wall thicknesses, each shape having an energy absorbing and resiliency characteristic. The formation of geometric shapes is positioned depending upon the vehicle stiffness characteristics and the degree of impact absorption required. Geometric shapes employed may consist of sinusoidal waveforms, a gabled design, or either of the preceding with an internal strengthening rib employed to alter formation impact absorbing characteristics. The formation contains an orifice to ensure that vehicle occupant energy is efficiently absorbed during the concurrent events of formation compaction and air expulsion through the orifice. The blow molded formation may be glued or otherwise suitably fastened to an automobile headliner, door panel, pillar, or other location.

20 Claims, 8 Drawing Sheets

BLOW MOLDED (HIC) FORMATION WITH ENERGY BUFFERS

FIELD OF THE INVENTION

The present invention relates generally to a motor vehicle occupant impact absorption device, and more particularly to a blow molded mechanical, polymeric structure for dampening automobile occupant head impact energy within a collapsing section. By achieving a prescribed head impact criterion (HIC) rating, the Blow Molded (HIC) Formation with Energy Buffers permits bodily energy, due to vehicular impact, to be absorbed in a controlled fashion.

BACKGROUND

Vehicle manufacturers and suppliers alike are constantly striving to improve occupant safety. Part of this initiative is increasing the ability of the vehicle interior to absorb occupant energy during a vehicle impact. More specifically, there is a major initiative on behalf of automobile manufacturers to design new energy absorbing materials and new energy absorbing buffers from existing or new materials to equip the interior of automobiles.

Major automobile interior impact energy absorbing devices conventionally include extruded polystyrene, extruded polypropylene, other compressible and collapsible foams, and air-operated supplemental restraint systems (SRS) which utilize supplemental air bags (SAB) to restrain vehicle occupants and absorb occupant energy in the event of vehicular impacts. While current occupant restraining and impact energy absorbing devices have proven to be satisfactory for their applications, it remains desirable to advance the relevant art.

SUMMARY OF THE INVENTION

In accordance with the teachings of the present invention, a blow molded (HIC) formation with energy buffers for absorbing energy during impact with a vehicle headliner or other interior area of a vehicle is disclosed.

In one preferred embodiment, the blow molded (HIC) formation with energy buffers is a single and continuous hollow plastic device defined by a surrounding shell. The surrounding shell is formed by a plurality of geometric figures designed to absorb impact in conjunction with the automotive structural device to which it is attached. The major parts of a blow molded (HIC) formation with energy buffers include a plastic peripheral shell and a plurality of geometric formations which define the peripheral shell. The peripheral shell is formed during a blow molding process and may include a strengthening rib to provide an alternate impact criterion for the particular buffer involved. The peripheral shell can also be formed to provide an integrally formed attachment device as part of the attachment side of the peripheral shell.

In another preferred embodiment, the blow molded (HIC) formation with energy buffers is a single and continuous hollow plastic device defined by a surrounding shell. The surrounding shell is formed by a plurality of geometric figures designed to absorb impact in conjunction with the automotive structural device to which it is attached. The geometric profiles in this embodiment are a plurality of hipped or gable shaped buffers comprising a single side of the shell. The opposing side of the shell is generally flat and is the mounting side for this embodiment.

In still another preferred embodiment, the blow molded (HIC) formation with energy buffers is a single and continuous hollow plastic device defined by a surrounding shell. The surrounding shell is formed by a plurality of geometric figures designed to absorb impact in conjunction with the automotive structural device to which it is attached. The geometric buffers in this embodiment are a plurality of sinusoidal shaped buffers comprising a single side or each side of the shell. The opposing sides of the shell consist of the sinusoidal buffers aligning as mirror images of each other.

In yet another preferred embodiment, a blow molded (HIC) formation with energy buffers includes an integrally molded fastener as part of its peripheral shell. The integrally molded fastener is molded into the generally flat side of the peripheral shell, but in the event the shell does not have a generally flat side, they may be molded into either of the buffer containing sides.

In yet another preferred embodiment, a blow molded (HIC) formation with energy buffer includes an external fastener, attached by conventional means, to the outside of the generally flat side of the peripheral shell, but in the event the shell does not have a generally flat side, they may be attached to either of the buffer containing sides.

In still yet another preferred embodiment, a blow molded (HIC) formation with energy buffer includes an inlet/outlet orifice. The size of the inlet/outlet orifice depends upon the desired rate of air expulsion required upon the impact of the blow molded (HIC) formation. The controlled exhaustion of air assists in the deceleration of any object impacting the device. Additionally, the orifice is used during the blow molding process as an air inlet.

In yet another preferred embodiment, a blow molded (HIC) formation with energy buffer includes a shell of varying wall thickness. The wall thickness is varied depending upon the shell deformation characteristics required which depends upon the specific location of the blow molded (HIC) formation with energy buffers within the automobile. The deformation characteristics are also dependent upon the stiffness of the surrounding automobile structure.

In yet another preferred embodiment, a blow molded (HIC) formation with energy buffers includes a shell of varying overall thickness. That is, the overall blow molded (HIC) formation with energy buffers may be constructed to be of a variety of overall thicknesses depending upon the location and space constraints within the vehicle.

Further in another preferred embodiment, a blow molded (HIC) formation with energy buffers includes a strength rib integrally molded into the buffer of the peripheral shell.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of a blow molded (HIC) formation with energy buffers is merely exemplary in nature and is not intended to limit the invention or its application or uses. Moreover, while the present invention is described in detail below generally with respect to an automotive interior application, it will be appreciated by those skilled in the art that the present invention is clearly not limited to only an automotive application, and may be applied to various other types of vehicles where occupant protection is desired, as further discussed herein.

Figure 1:
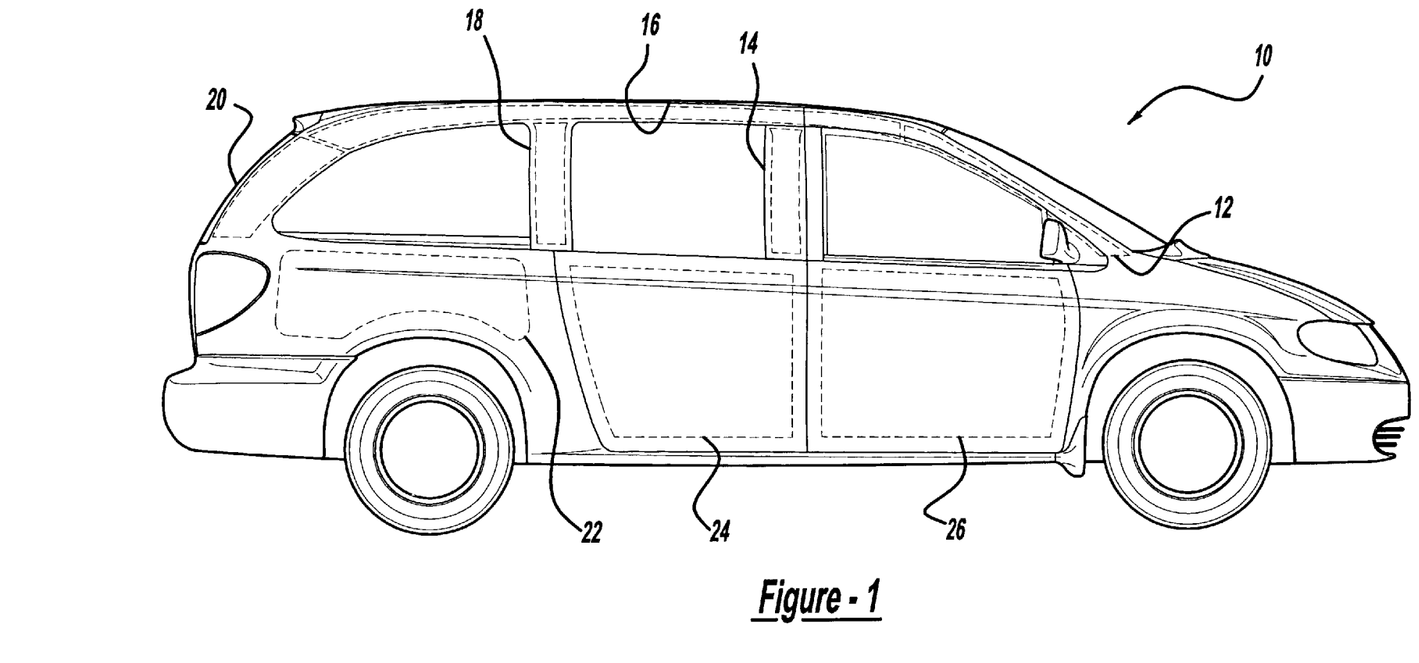
FIG. 1 is an environmental view of an automobile showing in phantom, the interior locations of representative examples of the blow molded (HIC) formation with energy buffers.
Figure 2:
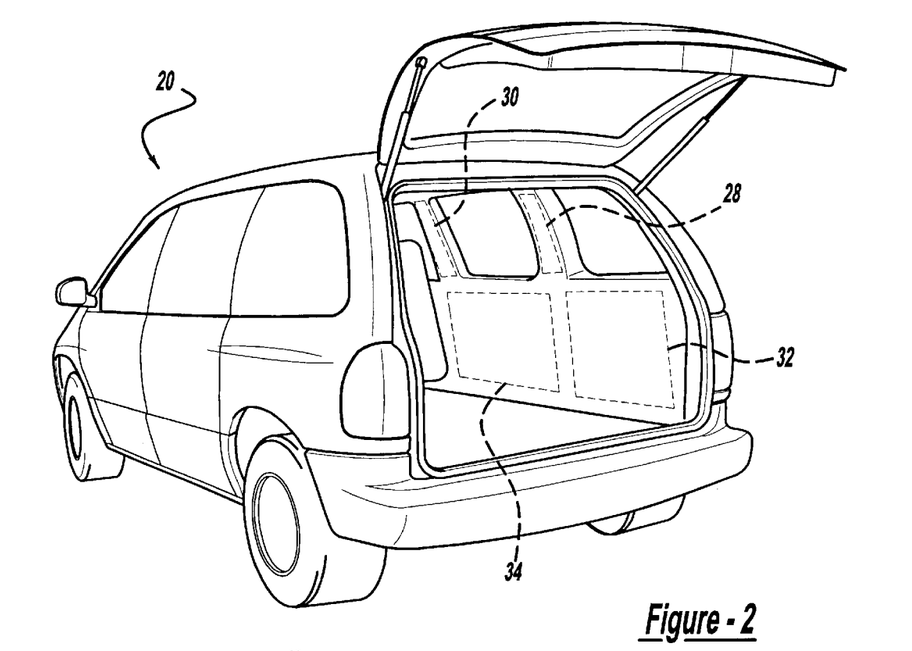
FIG. 2 is a perspective view of an automobile interior showing in phantom, the locations of representative examples of the blow molded (HIC) formation with energy buffers.
Figure 3:
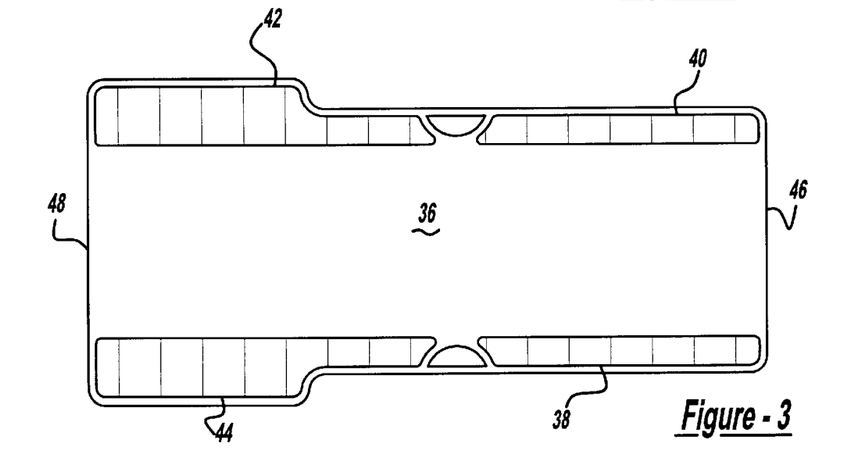
FIG. 3 is a top view of an automobile showing the blow molded (HIC) formation with energy buffers installed in an automobile interior headliner.
Figures 4, 5:
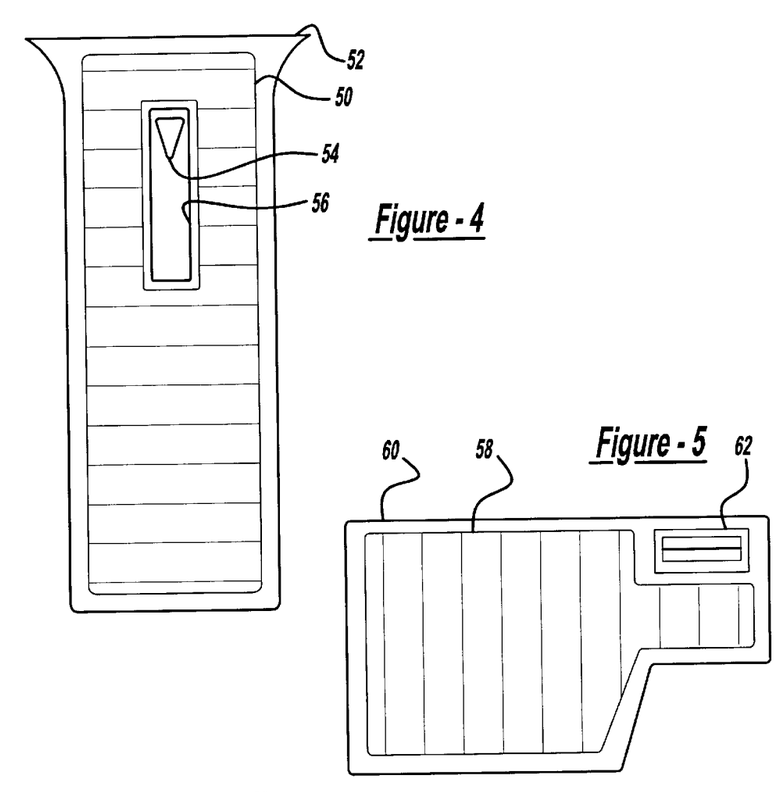
FIG. 4 is a perspective view of an automobile interior B-pillar column showing a blow molded (HIC) formation with energy buffers.
FIG. 5 is a perspective view of an automobile interior door panel showing a blow molded (HIC) formation with energy buffers.
Figure 6:
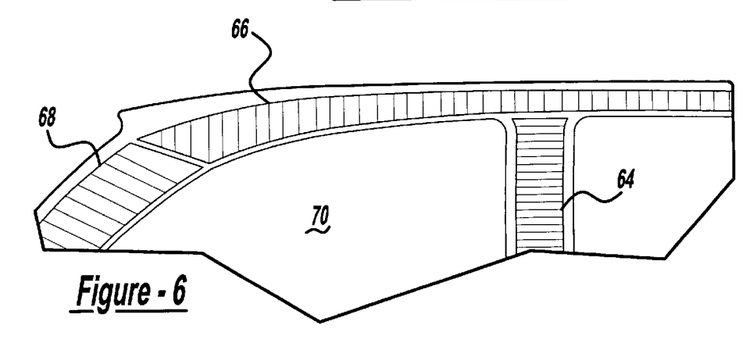
FIG. 6 is a perspective view of an automobile B-pillar, C-pillar and roof section showing the representative positions of the blow molded (HIC) formation with energy buffers on the automobile interior.

Referring to FIG. 1, an automobile 10 is depicted showing, in phantom, a representative example of the various locations of a blow molded (HIC) formation with energy buffers 12, 14, 16, 18, 20, 22, 24 and 26 in accordance with the teachings of the present invention. FIG. 2 shows an automobile 10 showing in phantom, the locations of representative examples of the blow molded (HIC) formation with energy buffers 28, 30, 32 and 34 generally located in the areas where occupant contact is likely during a vehicular impact. FIG. 3 shows a top view of an automobile 10 headliner area 36 with blow molded (HIC) formation with energy buffers 38 and 40, shown at automobile front end 46, and buffers 42 and 44 shown at automobile rear end 48. FIG. 4 shows a blow molded (HIC) formation with energy buffers 50 located in an automobile B-pillar 52 around the area generally occupied by the adjustable shoulder belt direction loop 54 and the shoulder belt adjustment track area 56. FIG. 5 shows a blow molded formation with energy buffers 58 located in an automobile door panel 60 and around the area occupied by the door handle 62. FIG. 6 shows a blow molded (HIC) formation with energy buffers 64, 66 and 68 located in a rear area 70 of an automobile 10 of FIG. 1.

Figures 7, 8, 9, 10:
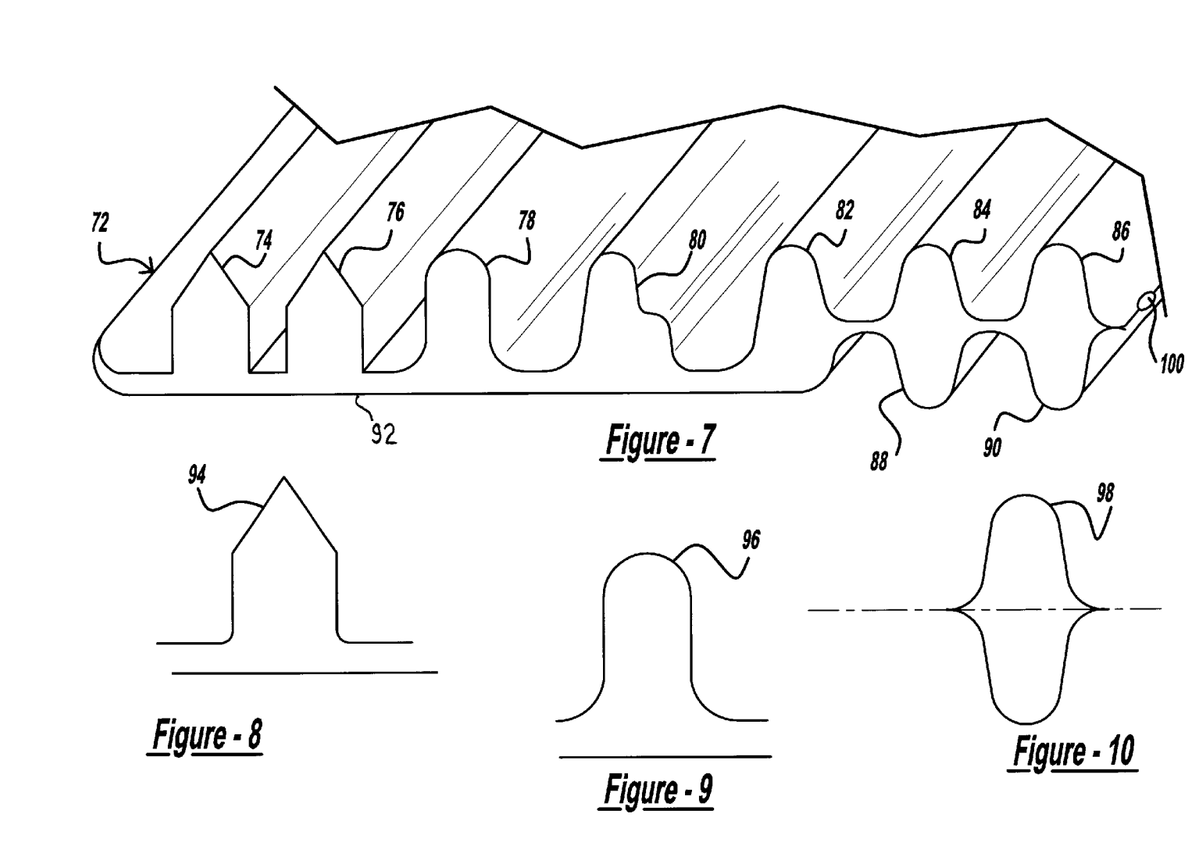
FIG. 7 is a perspective view of a representative section of a blow molded (HIC) formation with energy buffers showing buffers on a single side of the formation and also on both sides of the formation.
FIG. 8 is a front view of a gabled or hipped buffer utilized in the blow molded (HIC) formation with energy buffers.
FIG. 9 is a front view of a single sinusoidal buffer utilized in the blow molded (HIC) formation with energy buffers.
FIG. 10 is a front view of a double sinusoidal buffer utilized in the blow molded (HIC) formation with energy buffers.
Figure 7:
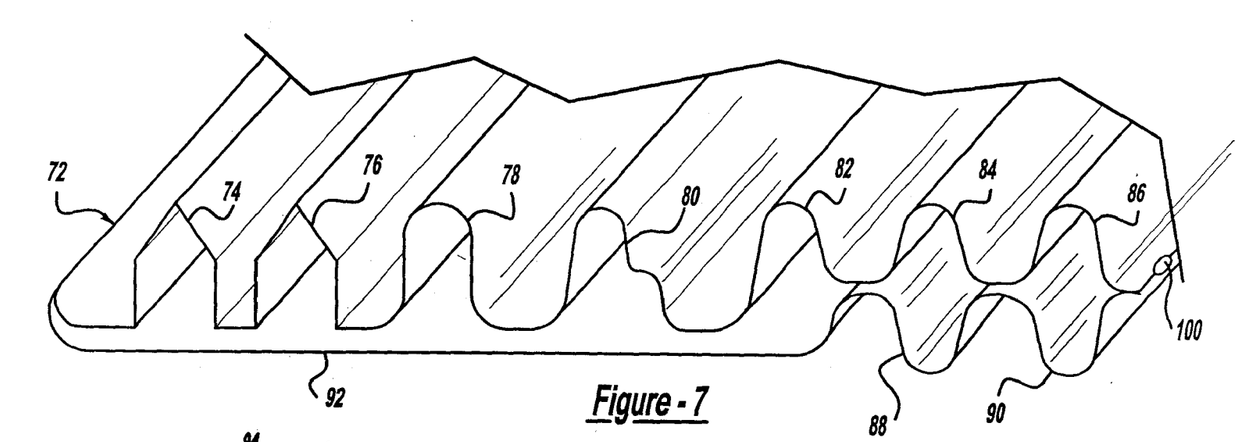
Figure 8:
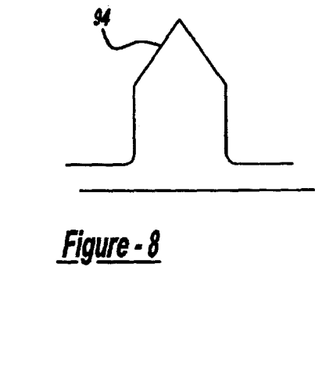
Figures 9, 10:
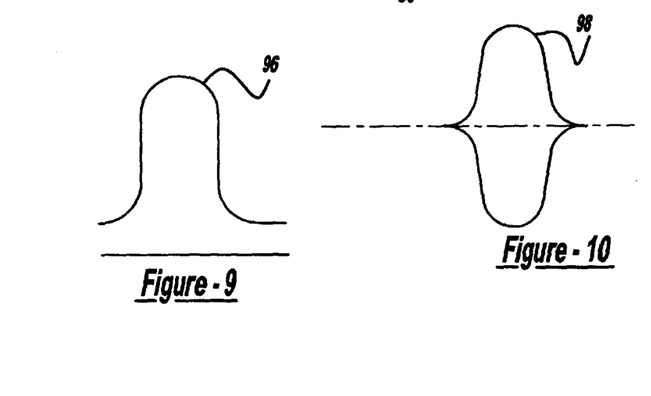

FIG. 7 shows a blow molded (HIC) formation with energy buffers 72 featuring multiple buffers 74, 76, 78, 80, 82, 84, 86, 88 and 90 which define the peripheral shell of the blow molded (HIC) formation with energy buffers 72. The peripheral shell with multiple buffers defines the internal cavity that results from the blow molding process. Buffer 94 of FIG. 8, buffer 96 of FIG. 9, and buffer 98 of FIG. 10 are representative of the available buffers of the blow molded formation with energy buffers 72 of FIG. 7. Buffer 94 of FIG. 8 is termed a gabled, or hipped buffer, buffer 96 of FIG. 9 is known as a sinusoidal buffer, and buffer 98 of FIG. 10 is known as a double sinusoidal buffer. Side 92 of FIG. 7 is generally flat or appropriately curved to accommodate the profile of a vehicle headliner or other automotive structure to securely mount the blow molded formation with energy buffers 72 within the automobile. Additionally, the blow molded (HIC) formation with energy buffers 72 features an orifice 100. The orifice 100 permits the introduction of air to form the blow molded (HIC) formation with energy buffers 72 and also acts as a governor to regulate the rate of air expulsion during an impact. The larger orifice 100 becomes, the faster the rate of expulsion. Therefore, in addition to varying the specific geometric profiles of the buffers to alter the deformation and energy absorbing characteristics of the blow molded (HIC) formation with energy buffers 72, the size of orifice 100 may be varied.

The blow molded (HIC) formation with energy buffers 72 is also adaptable to fit in areas where vehicle structural members, wiring or other conduit might otherwise interfere with the blow molded formation with energy buffers 72. To adapt to the noted potential interfering vehicle structures, the blow molded formation with energy buffers 72 is moldable with contoured buffer 80 of FIG. 7. It should also be noted that while the substantial portion of the blow molded (HIC) formation with energy buffers 72 contains a substantially flat surface 92, FIG. 10 exemplifies that it is within the scope of the present invention to create a blow molded (HIC) formation with energy buffers 72 having a dual profile buffer 98. A dual profile buffer 98 is a mirror image of itself about its centerline. FIG. 7 also exemplifies a dual profile buffer 84 and 88. However, it is also within the scope of the present invention to have a dual profile buffer that is not a mirror image of itself, such as the dual profile buffer 88. It should also be noted that the blow molded (HIC) formation with energy buffers 72 may accommodate multiple buffers along a single surface or on both surfaces simultaneously, as evidenced with buffers 84 and 88.

Figures 11, 12, 13, 14:
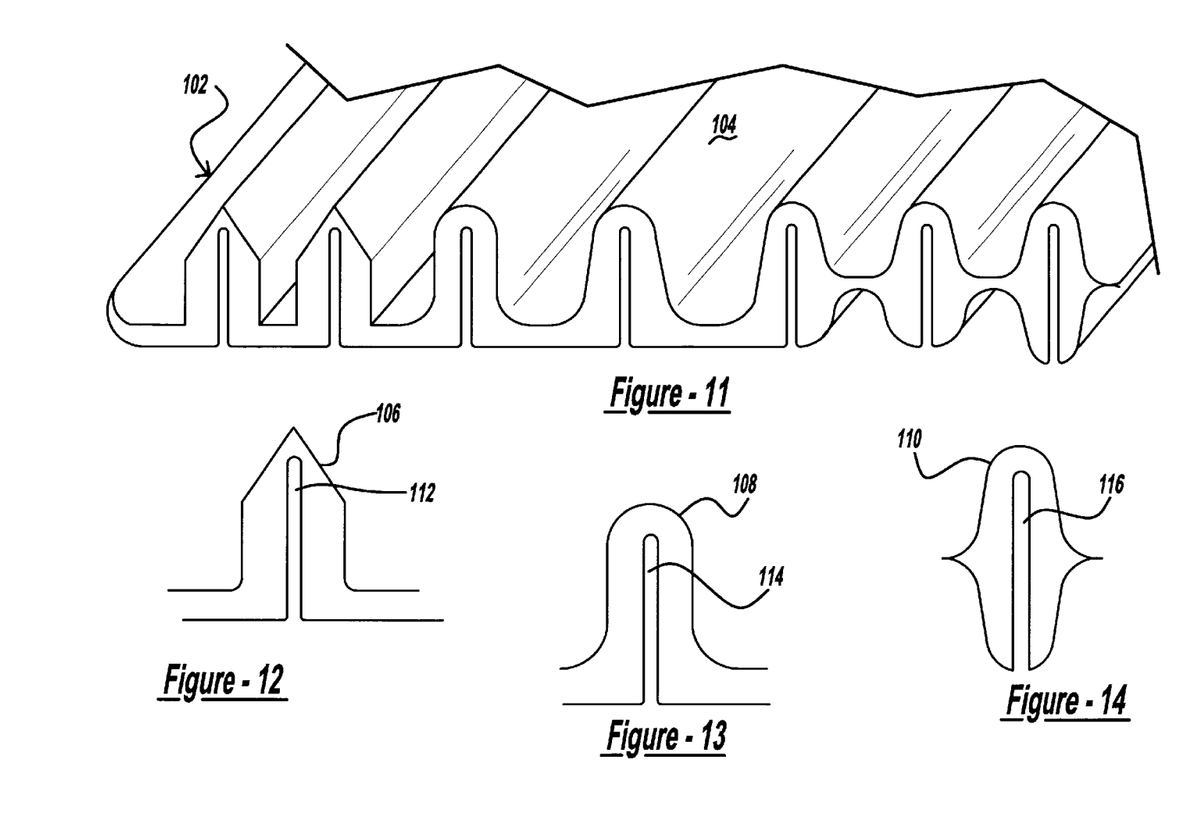
FIG. 11 is a perspective view of a representative section of a blow molded (HIC) formation with energy buffers showing buffers on each buffer having an internal strength rib.
FIG. 12 is a perspective view of a gabled or hipped buffer, with strength rib, utilized in the blow molded (HIC) formation with energy buffers.
FIG. 13 is a perspective view of a single sinusoidal buffer, with strength rib, utilized in the blow molded (HIC) formation with energy buffers.
FIG. 14 is a perspective view of a double sinusoidal buffer, with strength rib, utilized in the blow molded (HIC) formation with energy buffers.

FIG. 11 shows a blow molded (HIC) formation with energy buffers 102 featuring multiple buffers along a surface 104. However, buffers 106, 108 and 110 of FIGS. 12, 13 and 14, respectively, incorporate a strengthening rib 112, 114 and 116, respectively, to bolster the buffer strength in absorbing occupant energy.

Figure 15:
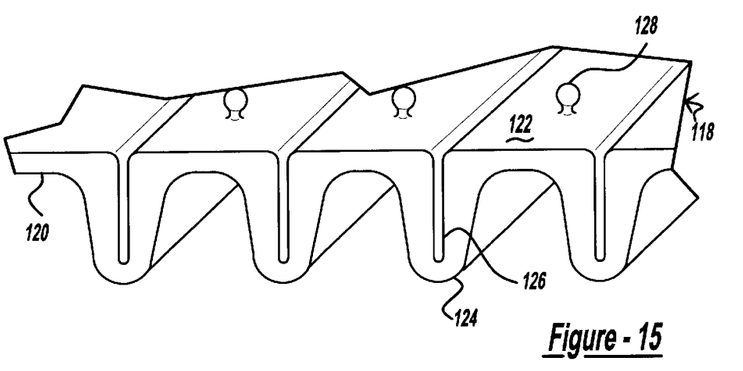
FIG. 15 is a perspective view of a representative blow molded (HIC) formation with energy buffers showing buffers with strength ribs on a single side of the formation, and a plurality of integral attachment devices.

FIG. 15 shows a blow molded (HIC) formation with energy buffers 118 featuring multiple buffers along a side 120 and an opposite, substantially flat surface 122. Buffer 124 is representative of the buffers along the side 120 designed to absorb impact, and in addition to having an impact absorbing strength rib 126 within its interior, the entire blow molded formation with energy buffers 118 contains integral attachment devices 128.

Figures 15, 16, 17, 18:
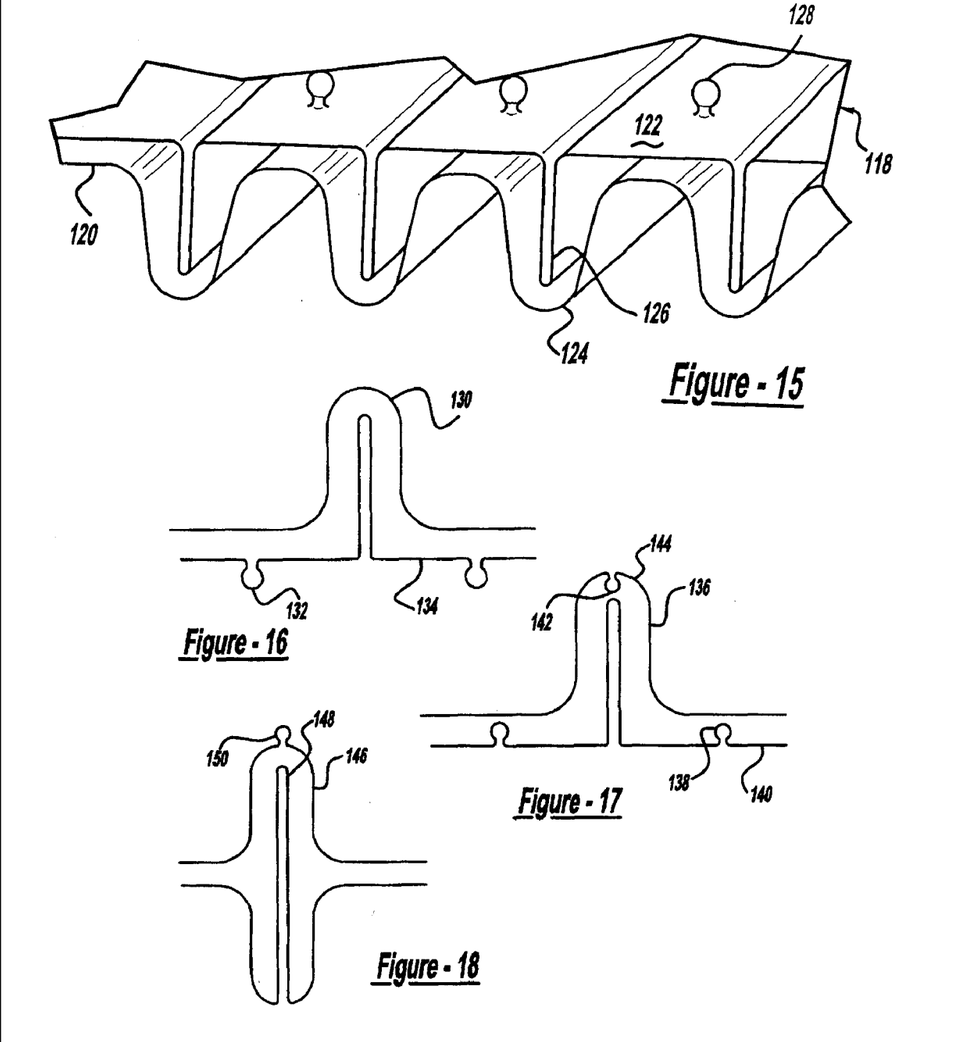
FIG. 16 is a front view of a single sinusoidal buffer utilized in the blow molded (HIC) formation with energy buffers, the single buffer showing integral external attachment devices.
FIG. 17 is a front view of a single sinusoidal buffer, with strength rib, utilized in the blow molded (HIC) formation with energy buffers, the buffer having a plurality of integral internal attachment devices.
FIG. 18 is a front view of a double sinusoidal buffer, with strength rib, utilized in the blow molded (HIC) formation with energy buffers, the buffer having an integral external attachment device.
Figures 16, 17, 18:
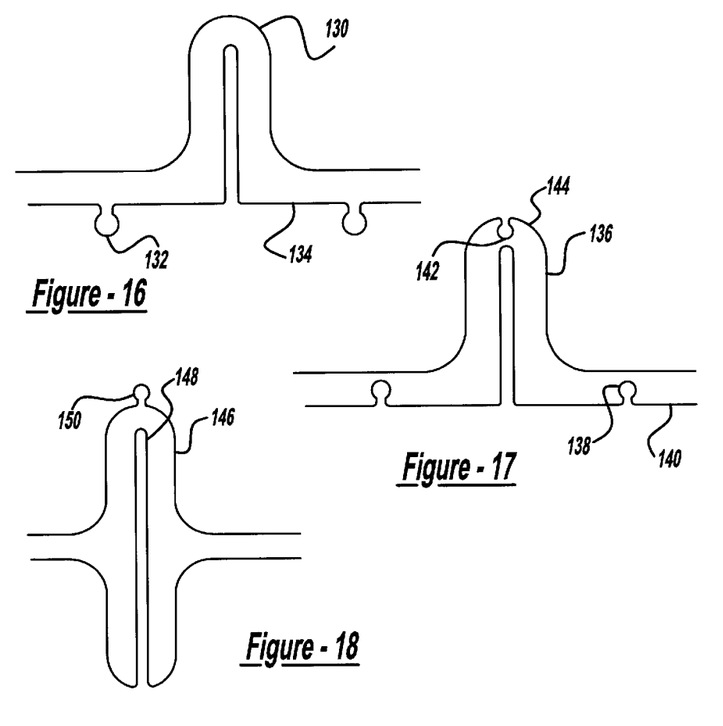

Buffer 130 of FIG. 16 shows an attachment device 132 which may be integrally molded into the substantially flat surface 134 of the buffer 130, or the attachment device 132 may be mechanically or thermally attached to the buffer 130. Alternatively, a buffer 136 as shown in FIG. 17, may have an attachment device 138 molded into a flat surface 140 or an attachment device 142 may be molded into the buffer tip 144. A double sinusoidal buffer 146 having a strength rib 148 and an attachment device 150 is represented in FIG. 18. The attachment device 150 may either be integrally molded into the buffer 146 or mechanically attached.

Figure 19:
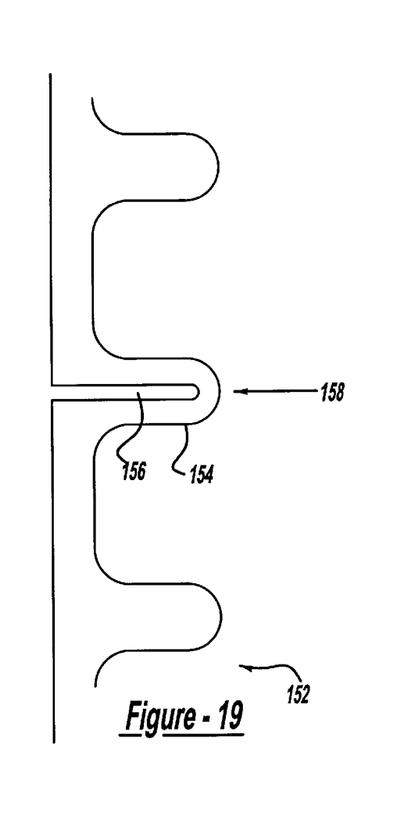
FIG. 19 is a side view of a blow molded (HIC) formation with energy buffers, the buffer having an internal strength rib and showing a representative point of impact upon the buffer.
Figures 20, 21:
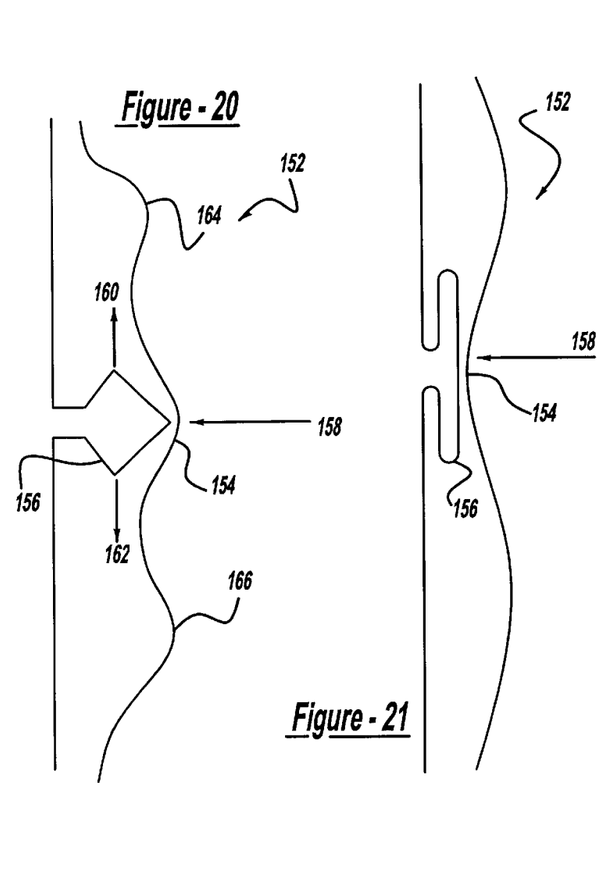
FIG. 20 is a side view of a blow molded (HIC) formation with energy buffers showing the point of impact upon the buffer and the intermediate deformation of the strength rib.
FIG. 21 is a side view of a blow molded (HIC) formation with energy buffers showing the point of impact upon the buffer and the advanced deformation of the strength rib.

With reference to FIGS. 19 through 21, a representative impact will now be explained to further illustrate the advantages of the blow molded (HIC) formation with energy buffers. FIGS. 19 through 21 show a representative blow molded (HIC) formation with energy buffers 152 exhibiting a representative buffer 154 with strengthening rib 156 undergoing a typical deformation when a force represented by arrow 158, hereinafter, force 158, is applied. FIG. 19 shows a buffer 154 with a strengthening rib 156 just before the application of force 158. FIG. 20 shows the initial application of force 158 and an initial absorption of energy and deformation of buffer 154. Upon continued application of force 158, the buffer 154 and strengthening rib 156 begin to deform in the directions represented by arrow 160 and arrow 162. Additionally, FIG. 20 shows how the force 158 and subsequent deformation of buffer 154 also affect adjacent buffers 164 and 166. The sinusoidal buffer 154 of FIG. 20 allows creep of the material at the initial impact of buffer 154. A longer true length of line created by the sine wave buffers 164 and 166, push into the top of collapsible strengthening rib 156 creating a momentary folding of the strengthening rib and the dissipation of energy as the strengthening rib 156 rolls over onto itself until the strengthening rib 156 reaches its fully collapsed position in FIG. 21. At this point, buffer 154 and rib 156 reach their maximum deformation due to force 158. An added feature of the blow molded (HIC) formation with energy buffers is the resiliency of the buffers and their ability to absorb energy for more than a single impact. Because of the designs of the buffers, the buffers inherently have a level of spring-back or resiliency built into them. This is what permits the buffers to be utilized for more than a single impact. Therefore, the deformation process due to impact represented by FIGS. 19 through 21 may be repeated in a matter of seconds for a given impact of a given blow molded (HIC) formation with energy buffers.

Figure 22:
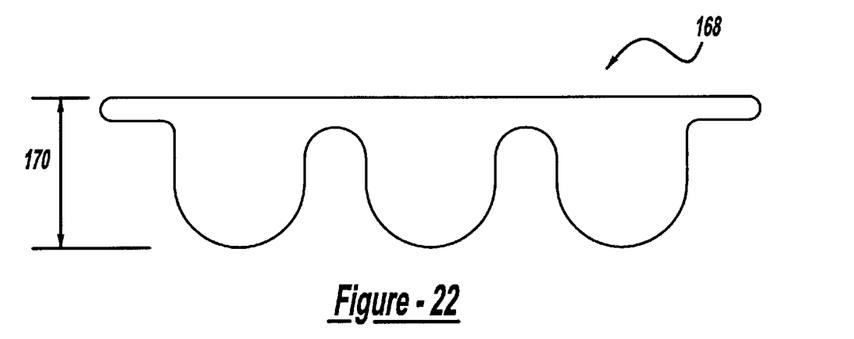
FIG. 22 is a side view of a blow molded (HIC) formation with energy buffers showing a representative thickness of the overall formation.
Figure 23:
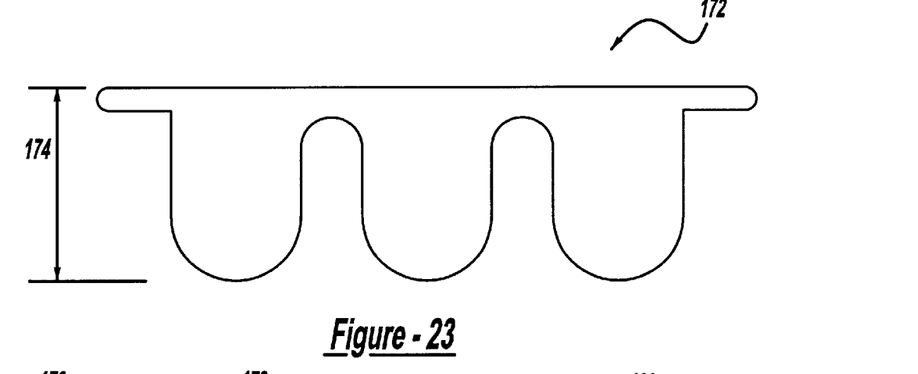
FIG. 23 is a side view of a blow molded (HIC) formation with energy buffers showing a representative thickness of the overall formation.

The blow molded (HIC) formation with energy buffers are particularly adaptive to absorbing energy within an automobile interior because of the options available in varying the physical parameters of the blow molded (HIC) formation with energy buffers. For instance, FIG. 22 shows a blow molded (HIC) formation with energy buffers 168 having an overall formation height of 170 and FIG. 23 shows a blow molded (HIC) formation with energy buffers 172 having a lower overall formation height of 174. The ability to regulate and mold the blow molded (HIC) formation with energy buffers into a variety of overall heights is a significant advantage when designing energy absorbing materials to fit into an automobile where a variety of space limitations restricts the materials available for use, or at least their simple and efficient adaptation to the space allotted. The ability to form the energy buffers in a variety of wall thicknesses along a continuous piece is also beneficial.

Figure 24:
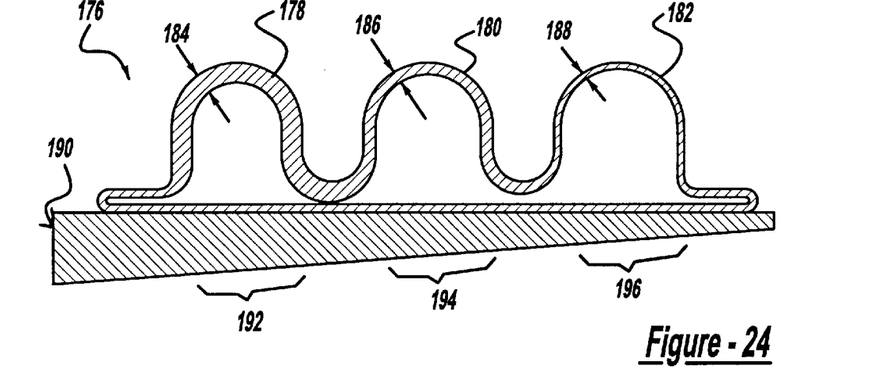
FIG. 24 is a side view of a blow molded (HIC) formation with multiple wall thickness energy buffers adhered to an automobile structure.

The blow molded (HIC) formation with energy buffers are moldable into a variety of specific wall thicknesses along a single molded formation. FIG. 24 exemplifies a section view of a blow molded (HIC) formation with energy buffers 176, having buffers 178, 180 and 182. Continuing, buffer 178 has a cross-sectional thickness 184, buffer 180 has a cross-sectional thickness 186, and buffer 182 has a cross-sectional thickness 188. Because the blow molded (HIC) formation with energy buffers is able to be molded with a varying wall thickness, a variety of impact absorbing characteristics are achievable with a single molded part. This means that the individual stiffness continuum of particular automotive structural members may be taken into consideration with a single blow molded (HIC) formation with energy buffers. This has the advantage of saving parts, material, labor and time when the blow molded (HIC) formation with energy buffers is installed into an automobile 10 as in FIG. 1.

To elaborate further, because the blow molded (HIC) formation with energy buffers 176 of FIG. 24 has multiple wall thicknesses, the formation will accommodate an interior automotive structure of varying stiffness. This presents the advantage of being able to provide the interior occupants with a consistent level of impact absorption at multiple locations within the vehicle interior since each vehicle has interior mounting structures that vary in stiffness. That is, the stiffer a structure, the less likely it is to absorb impact compared to its less stiff counterpart. Accordingly, each structure's stiffness varies along its length, and because the structural stiffness varies, the structure is able to absorb impact at different rates along its length. In order to meet changing U.S. Federal standards with respect to HIC, the blow molded (HIC) formation with energy buffers compensates for this variation in vehicle structure stiffness.

FIG. 24 shows, in addition to a blow molded (HIC) formation with energy buffers 176, an automobile structural member 190 of varying thickness, which is directly proportional to stiffness. That is, the thicker the cross section, the stiffer the structure. Therefore, the blow molded (HIC) formation with energy buffers 176 of FIG. 24 is designed to accommodate the automobile structure 190 of varying stiffness. As such, buffer 178 has a cross-sectional thickness 184 associated with it and is designed into the blow molded (HIC) formation with energy buffers 176 above the automobile structure 190 at area 192. Since the automobile structure 190 is thicker at area 192, relative to area 196, the cross-sectional thickness 184 of buffer 178 will also be thicker than the buffer 182 above area 196. This is because the buffer 178 must be capable of decelerating an impacting object (not shown) before the object strikes the automobile structure 190 at area 192. Accordingly, the object must strike the automobile structure 190 at area 192 after collapsing the buffer 178 at such a reduced rate as to not negatively affect the HIC measurements of the impacting object. If the impacting object is not decelerated enough before striking the automobile structure 190 at area 192, it will result in an unacceptable HIC. Likewise, buffer 182 has a cross-sectional thickness 188 that is thinner than cross-sectional thickness 184 of buffer 178 because the automobile structure 190 at area 196 is thinner and hence, has a lower stiffness. With regard to HIC, this means that an impact at buffer 182 that is not stopped, will result in an impact at area 196 of the automobile structure 190 which may result in an acceptable HIC. Because the automobile structure 190 at area 196 is of a stiffness that is capable of providing an acceptable level of deceleration, the lesser cross-sectional thickness 188 of buffer 182 is acceptable when compared to buffer 178. Buffer 180 is designed with a cross-sectional thickness 186 that is intermediate to that of buffer 178 and buffer 182 because the thickness above area 194 of the automobile structure 190 is intermediate to areas 192 and 196.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An impact absorbing member for a motor vehicle interior, the impact absorbing member comprising:
   a blow-molded peripheral shell formed to define a hollow internal cavity between a base surface and an external surface of the shell, wherein at least the external surface is formed to create a plurality of geometric buffer elements to define the peripheral shell.

2. The impact absorbing member for a motor vehicle interior of claim 1 wherein said peripheral shell is of varying wall thickness to provide a range of impact criterion.

3. The impact absorbing member for a motor vehicle interior of claim 1 wherein said geometric buffer elements are in the shape of sinusoidal waveforms.

4. The impact absorbing member for a motor vehicle interior of claim 1 wherein said geometric buffer elements are gable-shaped.

5. The impact absorbing member for a motor vehicle interior of claim 1 wherein said geometric buffer elements are in the shape of a mirror image, double sinusoidal waveform.

6. The impact absorbing member for a motor vehicle interior of claim 1 wherein at least one of said geometric buffer elements further comprises a strengthening rib formed within the internal cavity.

7. The impact absorbing member for a motor vehicle interior of claim 1 further comprising a fastener on said external surface.

8. The impact absorbing member for a motor vehicle interior of claim 7 wherein said exterior fastener is integrally molded into said peripheral shell.

9. An energy absorbing member for an automobile structural member, the energy absorbing member comprising:
   a blow molded peripheral shell formed to define a hollow internal cavity between a substantially flat base surface and a first surface formed to create a plurality of geometric buffer elements.

10. The energy absorbing member of claim 9 wherein said peripheral shell further comprises at least one depression for accommodating protuberant structures of said automobile structure.

11. The energy absorbing member of claim 9 further comprising a blow-molded integral fastener of the same material as said peripheral shell.

12. The energy absorbing member of claim 9 further comprising a fastener affixed to said peripheral shell and oriented for mounting to said automobile structural member.

13. A blow molded formation for fastening to an automobile structure, the formation comprising:
   a continuous, resilient, blow molded peripheral shell defining a hollow internal cavity and an orifice in the shell;
   a plurality of geometric buffer elements defining a first side of the peripheral shell; and
   a second side, located opposite the first side and defining the remainder of the peripheral shell.

14. The blow-molded formation of claim 13 wherein said geometric buffer elements are in the shape of sinusoidal waveforms.

15. The blow-molded formation of claim 14 wherein said second side further comprises sinusoidal waveforms such that said sinusoidal waveforms of said first side are substantially mirror images of said sinusoidal waveforms of said second side.

16. The blow-molded formation of claim 15 wherein said sinusoidal waveforms of said second side further comprise an integral strengthening rib.

17. The blow molded formation of claim 13 wherein said second side further comprises a substantially flat surface.

18. The blow-molded formation of claim 17 wherein said second side comprises an integrally molded strengthening rib, said integrally molded strengthening rib is molded from said substantially flat surface of said second side toward said first side.

19. The blow-molded formation of claim 13 wherein said geometric buffer elements are gabled.

20. The blow-molded formation of claim 13 wherein said orifice governs an exiting pressure upon impact of said blow-molded formation.

* * * * *

UNITED STATES PATENT AND TRADEMARK OFFICE
CERTIFICATE OF CORRECTION

PATENT NO.    : 6,588,557 B2
DATED         : July 8, 2003
INVENTOR(S)   : Williams et al.

It is certified that error appears in the above-identified patent and that said Letters Patent is hereby corrected as shown below:

Replace title page with the attached title page.

<u>Drawings,</u>
Replace drawing sheets 4, 5 and 6 with the following sheets 4, 5 and 6.

Signed and Sealed this

Twenty-fifth Day of November, 2003

JAMES E. ROGAN
*Director of the United States Patent and Trademark Office*

(12) United States Patent
Williams et al.

(10) Patent No.: US 6,588,557 B2
(45) Date of Patent: Jul. 8, 2003

(54) BLOW MOLDED (HIC) FORMATION WITH ENERGY BUFFERS

(75) Inventors: Shawn R Williams, Auburn Hills, MI (US); Matthew W Liddane, Canton, MI (US); Joseph G Lemmon, Chesterfield, MI (US); Jerry D Loman, Clinton Township, MI (US); Jeffrey S Rausch, Troy, MI (US); Thomas A Lariviere, Macomb, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 71 days.

(21) Appl. No.: 09/825,719

(22) Filed: Apr. 4, 2001

(65) Prior Publication Data

US 2002/0145298 A1 Oct. 10, 2002

(51) Int. Cl.[7] .......................... F16F 7/12; B60R 21/055
(52) U.S. Cl. ...................................... 188/377; 280/751
(58) Field of Search ...................... 188/377; 280/751; 296/39.1, 39.2, 189

(56) References Cited

U.S. PATENT DOCUMENTS

| | | | |
|---|---|---|---|
| 3,638,992 A | 2/1972 | Forshee | 296/39.1 |
| 3,868,796 A | 3/1975 | Bush | 52/783.12 |
| 4,890,877 A | 1/1990 | Ashtiani-Zarandi et al. | 296/146.7 |
| 5,253,918 A * | 10/1993 | Wood et al. | 296/39.2 |
| 5,435,619 A * | 7/1995 | Nakae et al. | 296/189 |
| 5,747,140 A | 5/1998 | Heerklotz | 428/131 |
| 5,749,193 A | 5/1998 | Bucher | 52/506.06 |
| 5,823,611 A | 10/1998 | Daniel et al. | 296/214 |
| 5,884,962 A | 3/1999 | Mattingly et al. | 296/189 |
| 6,036,227 A | 3/2000 | Lin et al. | 280/751 |
| 6,247,745 B1 * | 6/2001 | Carroll et al. | 296/189 |

* cited by examiner

*Primary Examiner*—Christopher P. Schwartz
(74) *Attorney, Agent, or Firm*—Edwin W. Bacon, Jr.

(57) ABSTRACT

A blow molded (HIC) formation with energy buffers provides absorption of vehicle occupant cranial impacts. A generally plastic, forced air, expanded formation defines a cavity, the formation walls being of varied geometric shapes having calculated wall thicknesses, each shape having an energy absorbing and resiliency characteristic. The formation of geometric shapes is positioned depending upon the vehicle stiffness characteristics and the degree of impact absorption required. Geometric shapes employed may consist of sinusoidal waveforms, a gabled design, or either of the preceding with an internal strengthening rib employed to alter formation impact absorbing characteristics. The formation contains an orifice to ensure that vehicle occupant energy is efficiently absorbed during the concurrent events of formation compaction and air expulsion through the orifice. The blow molded formation may be glued or otherwise suitably fastened to an automobile headliner, door panel, pillar, or other location.

20 Claims, 8 Drawing Sheets